United States Patent [19]
Spevack

[11] 3,984,518
[45] Oct. 5, 1976

[54] PROCESS FEED AND EFFLUENT TREATMENT SYSTEMS

[75] Inventor: Jerome S. Spevack, New Rochelle, N.Y.

[73] Assignee: Deuterium Corporation, White Plains, N.Y.

[22] Filed: July 17, 1974

[21] Appl. No.: 489,449

Related U.S. Application Data

[63] Continuation of Ser. No. 126,498, March 22, 1971, abandoned.

[52] U.S. Cl. .................................. 423/1; 210/57; 423/580; 55/73
[51] Int. Cl.² ............................................. B01D 19/00
[58] Field of Search ............... 203/7, 6; 210/57, 60, 210/63; 55/68, 73; 423/438

[56] References Cited
UNITED STATES PATENTS

| | | | |
|---|---|---|---|
| 2,887,441 | 5/1959 | Erickson | 203/11 |
| 2,895,803 | 7/1959 | Spevack | 23/181 X |
| 3,026,261 | 3/1962 | Mayfield et al. | 203/10 UX |
| 3,089,757 | 5/1963 | Buswell et al. | 55/73 UX |
| 3,097,917 | 7/1963 | Dotts et al. | 55/68 X |
| 3,165,452 | 1/1965 | Williams | 203/11 |
| 3,218,241 | 11/1965 | Checkovich | 203/11 X |
| 3,511,027 | 5/1970 | Roberts et al. | 55/73 X |
| 3,531,917 | 10/1970 | Grunewald et al. | 55/73 X |
| 3,672,125 | 6/1972 | Miller | 55/73 |

*Primary Examiner*—Hiram H. Bernstein
*Attorney, Agent, or Firm*—Hall & Houghton

[57] ABSTRACT

A liquid feed and effluent system to recover dissolved process gas (e.g. $H_2S$) from an effluent process liquid (e.g. water), which liquid may also contain dissolved solid components (e.g. soluble salts); the system heats the feed liquid with heat recovered from the effluent liquid, saturates the so heated feed liquid with process gas, which gas may also contain inert gas components, and separately discharges from the system such inert gas components and effluent liquid from which process gas and heat have been recovered. In the combination the dissolved process gas is preferably recovered from the effluent liquid by flashing at progressively reduced pressures and final vapor stripping thereof at the most reduced pressure.

14 Claims, 2 Drawing Figures

FEED & EFFLUENT

PROCESS FEED AND EFFLUENT TREATMENT SYSTEMS

CROSS REFERENCE TO RELATED APPLICATION

This is a continuation of application Ser. No. 126,498, filed Mar. 22, 1971 and now abandoned.

BACKGROUND OF THE INVENTION

1. Field of Invention

This application relates to improvements in feed and effluent treatment particularly but not exclusively adapted to use in dual temperature exchange systems utilizing an external water source as one of the process fluids and a partially water soluble gas as another process fluid.

2. Description of the Prior Art

In my prior U.S. Pat. Nos. 2,895,803 issued July 21, 1959 and 3,142,540 issued July 28, 1964 are disclosed a regenerative stripper system for stripping gas (e.g. $H_2S$) from a liquid (e.g. water) with the aid of steam supplied at temperature considerably higher than the temperature at which the liquid became saturated with the gas, followed by a partial recovery of the heat by indirect contact heat exchange with a cold process fluid.

SUMMARY OF THE INVENTION

Objects of the invention are to provide an improved feed and effluent treatment system adapted for improving the recovery of a gas (e.g. $H_2S$) from solution in liquid also a liquid (e.g. water) which contains dissolved nonvolatile components (e.g. the nonvolatile solutes of sea water and other contaminated waters), at low temperatures, and with greater effectiveness than said prior art systems; for conditioning the liquid feed supply for such systems in a simple and effective way; and for producing a distilled liquid by-product essentially free of the solubles of the feed.

DESCRIPTION OF PREFERRED EMBODIMENTS

Figure 1:
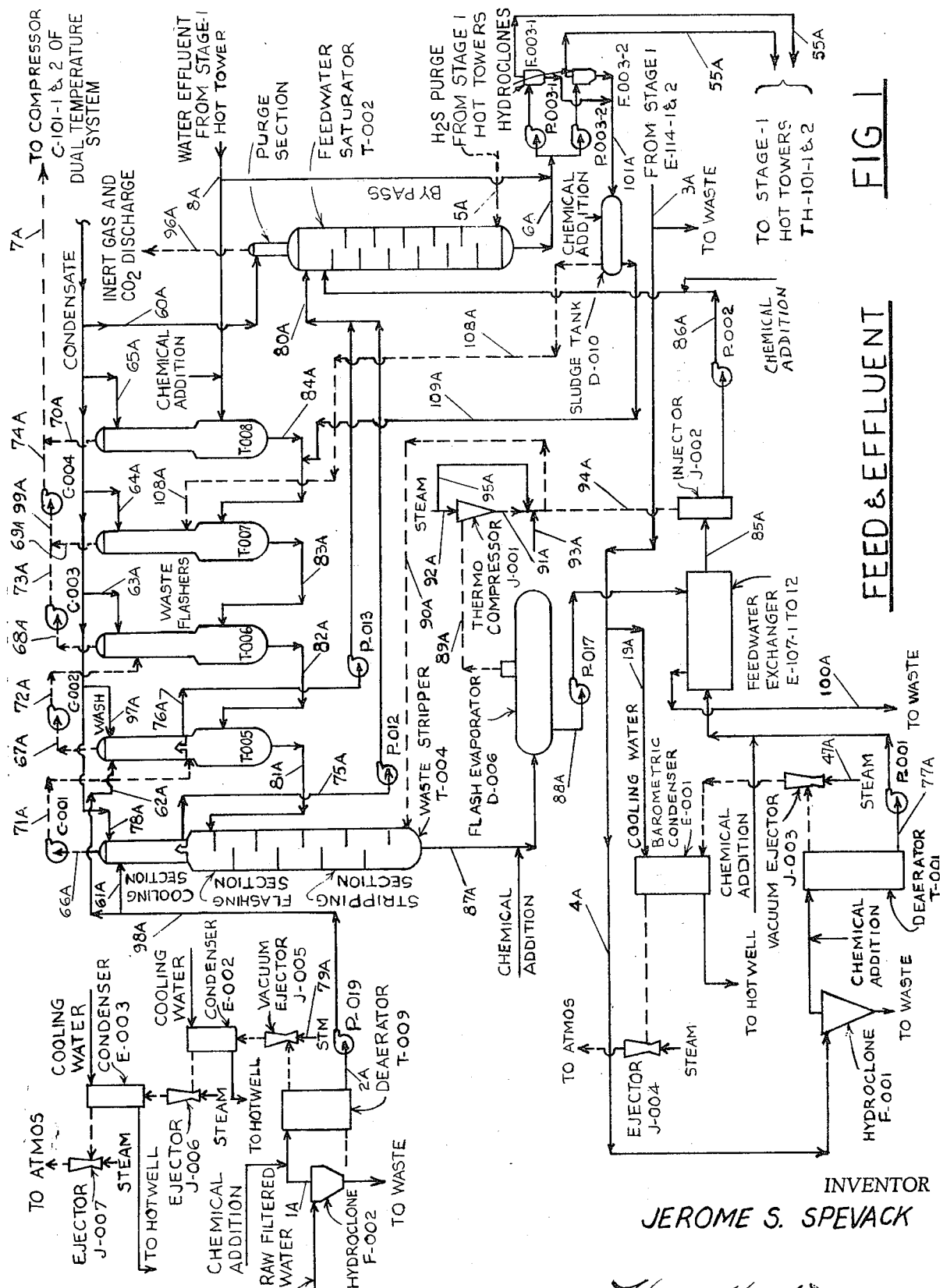
FIG. 1 is a simplified flow diagram of an integrated feed and effluent system for a hydrogen sulfide-water process, according to an embodiment of the invention in which a contaminated water (e.g. sea water) is the feed supply.

The embodiments shown in the drawings are particularly adapted for supplying treated liquid feed to, and treating liquid effluent from, a system processing such liquid and a gas partially soluble therein, such as is disclosed in my concurrently filed application Ser. No. 126,692, (now U.S. Pat. No. 3,860,698 issued Jan. 14, 1975), which is made a part hereof by reference.

By use of these embodiments, applied in the production of heavy water, advantage may be taken of the fact that sea water contains approximately 5% more deuterium content than do river and lake waters.

Referring to FIG. 1 of the accompanying drawings:

The feed water (e.g. sea-water) treating system is integrated in operation with the treatment of the impoverished sea-water discharged from the hot tower for disposal to waste, and provides the heated, $H_2S$ saturated sea-water for deuterium extraction in the dual temperature exchange system. In the illustrated embodiment, the feedwater has initially been utilized for cooling of process fluids in the dual temperature exchange system and is received slightly heated via 3A for treatment.

The feedwater then passes via 4A through a rubber-lined carbon-steel hydroclone cleaner F-001 where solids are removed in the underflow and discharged as waste. The cleaned feedwater than enters an epoxy-lined carbon-steel feed deaerator T-001 where dissolved oxygen and carbon dioxide gases are removed. Gases are withdrawn by the two stage action of two ejectors J-003 and J-004 and a barometric intercondenser E-001. Water from the bottom of the condenser discharges to a hot well.

Oxygen is removed to prevent corrosion of metal surfaces and to prevent sulfur precipitation when the water comes into contact with $H_2S$ used in the process, e.g. by the reaction $2H_2S + O_2 = 2H_2O + 2S$. Insoluble sulfur precipitates can clog the process equipment. Carbon dioxide is removed to prevent the dilution of the $H_2S$ process gas, and also to prevent accelerated corrosion of the equipment as a consequence of the carbonic acid found in aqueous solution thereby. The productivity of the dual temperature system is reduced in proportion to the accumulation of inert or non-exchanging contaminants in the process gas. The cooling water via 19A for the barometric intercondenser E-001 is split from the sea-water flow received via 3A; motive steam for the ejectors is taken off the intermediate pressure steam header.

A pump P-001 withdraws feedwater from the bottom of the deaerator via 77a and passes it to the tube side of the feedwater heat exchangers E-107-. A connection is provided in the passage to the exchangers for chemical addition, e.g. sulfuric acid injection. By this means suitable chemical agents or acid may be added to dissolve scale, e.g. precipitated sulfates or carbonates, if such should form on the heat exchanger tubes from the heating of the sea-water.

In the illustrated embodiment the E-107- heat exchangers are series connected in three parallel trains of four exchangers each. Hot sea-water effluent from the hot tower of the dual temperature system via 8A, after removal of dissolved hydrogen sulfide gas, is passed via 87A, 88A through the shell side of said exchangers whereby the feedwater in the tube side is heated to approximately 250° F. A thermocompressor J-001 supplies steam, which in part has been recovered via 89A from the sea-water effluent by flash evaporator D-006, via 94A, to an injector J-002 for further feedwater heating. The steam is injected into the feedwater at a rate controlled so as to maintain a feedwater temperature of 266° F.

A pump P-002 passes the heated sea-water feedwater stream to the top of the feedwater saturator T-002. The saturator is an Inconel-clad steel tower, designed to saturate approximately 2,000,000 pounds of heated feedwater per hour with $H_2S$ at 325 psia. An additional stream of heated sea-water that has been used in the upper cooling sections of the waste stripper P-004 and waste flasher P-005 for gas cooling, hereinafter described, is also discharged into the top of the saturator T-002. These water streams merge and flow downward T-002 against a countercurrent flow of gas consisting essentially of $H_2S$ delivered via 5a from the stage 1 hot tower of the dual temperature system becoming saturated with $H_2S$, and constitute the sea-water feed supply to the feed section of the stage 1 hot tower of the dual temperature system.

The $H_2S$ saturated feedwater is discharged from the bottom of the saturator via 6A and is pumped by the pumps P-003- to Inconel hydroclone cleaners F-003- for removal of heavy metal sulfides and other solids formed by reaction of dissolved minerals in the sea-water under the conditions existing in the saturator. The underflow from these hydroclone cleaners passes via 101A to a sludge tank D-010 for treatment before being removed, e.g. discharged into the effluent stream via 109A. Such treatment may include chemical addition, for example of an acid which reacts with the solids to solublize them and to form $H_2S$ gas for return to the dual temperature process gas system via 108A-7A. The saturated sea-water feedwater passes via 55A from the hydroclones to the top of the feed section of the stage 1 hot towers.

The gas consisting essentially of $H_2S$ delivered via 5a to the saturator T-002 is bled as a purge stream from the humidification section of the dual temperature stage 1 hot towers. Within the saturator, the $H_2S$ reacts with and decomposes dissolved bicarbonate salts, releasing carbon-dioxide gas ($CO_2$) and forming the hydrosulfide ($HS^-$ ion) and to a small degree the sulfide ($S^=$ ion) salts in substitution. The $CO_2$ together with other undissolved gases, e.g. nitrogen and hydrogen, are passed through the purge tower section at the top of the saturator. A small stream of relatively pure water, e.g. condensate, is introduced via 60A into the top of the purge tower section to absorb $H_2S$ contained therein and this water flows downward through the purge section and then merges with the feedwater stream in the saturator. The remaining gas stream, which comprises substantially all of the $CO_2$ and inert gas content of the fluids delivered to the saturator T-002, is removed via 96A from the system, e.g. to a flare for discharge to the atmosphere.

Cooling water for the gas cooling sections on top of the waste stripper T-004 and on top of the waste flasher T-005 is taken off via 1A from the sea-water supply line serving the dual temperature system stage 1 dehumidifier process liquid coolers. This water is passed through a hydroclone cleaner F-002 for removal of solids and the underflow is discharged to waste. The cleaned water passes to a deaerator T-009.

Chemical addition, e.g. of sulfuric acid, may be added to this sea-water through a connection upstream of the deaerator. Acid is added to decompose dissolved bicarbonate salts and evolve $CO_2$ before this water enters the waste flasher T-005 and waste stripper T-004, where it comes in contact with $H_2S$. The acid-generated $CO_2$ and other dissolved gases are removed from the water in the deaerator T-009 by the three-stage action of three ejectors J-005, J-006 and J-007 and two barometric condensers E-002 and E-003, and the deaerated water is then withdrawn by pump P-019 via 98A and is passed via 61A to the waste stripper T-004 and via 62A to the waste flasher T-005.

The effluent stream leaving via 100A is comprised principally of deuterium-depleted sea-water from the dual temperature stage 1 hot towers together with the treated underflow from hydroclone cleaners as above described.

A principle purpose of the effluent treating system is to recover the $H_2S$ which is present at a concentration of about two percent in the sea-water effluent from the dual temperature system. Another is to recover heat from the effluent which is at 266° F when it leaves the stage 1 hot towers. The $H_2S$ is recovered in the waste flashers T-008 to T-005 and the waste stripper T-004 and returned via 7A to the dual temperature system. Heat is recovered in the flash evaporator D-006 where the sea-water effluent after removal of $H_2S$ is partially flashed to steam for use in part via 90A in the waste stripper and in part via 94A to heat the incoming sea-water feed supply, and also in a series of heat exchangers E-107- where the remaining heat of the sea-water effluent before its discharge to waste is used to heat the incoming sea-water feed to the dual temperature system.

$H_2S$ is recovered by passing the hot sea-water effluent discharged from the feed section of the stage 1 hot tower through a series of four waste flashers T-008, T-007, T-006 and T-005 in that order. These are horizontal pressure vessels made of Inconelclad steel plate and consist of a flashing section and a gas cooling tower section wherein the released hot $H_2S$ is cooled by countercurrent direct contact with a flow of cool water. As illustrated, three of the waste flashers T-008, T-007, and T-006 have integrally mounted contactor cooling towers. One, T-005, operates in conjunction with a separately mounted contactor tower as is shown by the seal tray at 76A which only allows gas to pass therethrough. The waste flashers operate at successively lower pressures, e.g. 305, 250, 175 and 75 psi, respectively. At each stage of pressure reduction, $H_2S$ is evolved from the effluent. The flashed-off $H_2S$ flows upward to the gas cooler sections where water vapor is condensed and the $H_2S$ is cooled. The flashed $H_2S$ gas is then repressurized, e.g. by compression with gas compressors C-002, C-003 and C-004 to 305 psi, and returned via 7A to compressors C-101-1 & 2 of the dual temperature stage 1 gas system shown in FIGS. 9 (alt), Parts (A) and (B), of the aforesaid U.S. Pat. No. 3,860,698 . The gas from waste flasher T-008 is discharged therefrom at the 305 psi pressure of the top of the stage 1 cold tower and therefore does not require further pressure.

After passing through the waste flashers, the sea water effluent is passed to the waste stripper T-004 where the remaining dissolved $H_2S$ is removed in part by a flash to 35 psi and the remainder by action of a countercurrent flow of stripping steam. This waste stripper is an Inconel tower approximately 85 feet high. It consists of an upper cooling section separated as in T-005 and a lower flashing and stripping section. The $H_2S$ is evolved from the effluent in the flashing section and rises through the cooling section, and the effluent liquid proceeds downward to the stripping section where it flows against a countercurrent flow of stripping steam. $H_2S$ concentration in the sea-water effluent leaving the waste stripper is less than one ppm and the $H_2S$ stripped therefrom passes to the waste flasher compressor C-001 for compression and return to stage 1 as aforesaid.

The sea-water effluent from the waste stripper T-004 passes to a flash evaporator D-006 where a part of the water is flashed and evaporated to steam. The flash evaporator is a copper-nickel-alloy vessel approximately 6 feet in diameter and approximately 13 feet long. It operates in conjunction with a thermo compressor J-001 to recover some of the energy present in the effluent. The thermo compressor creates a reduced pressure in the evaporator vessel, converting a portion of the effluent to steam, which is exhausted via 91A for use as stripping steam via 90A to the waste stripper and for injection via 94A to the main sea-water feed stream to the dual temperature system. The hot effluent from the flash evaporator via 88A is pumped by pump P-017 through the shell side of the heat exchanger train E-107- to heat the main sea-water feedwater stream on the tube side therein. This cooled effluent is then discharged via 100A as waste.

The underflow from the sea-water feed hydroclones F-003- is discharged via 101A to a sludge tank D-010 where sulfuric acid is added. The sludge tank is an Inconel pressure vessel. $H_2S$ is evolved in the tank from the reaction of acid with sulfides removed in the hydroclone cleaners.

As shown, the evolved $H_2S$ vapor is passed to the gas cooler tower on the top of the waste flasher T-007 to join the flow of recovered gas to be returned to the dual temperature stage 1, and the discharge from the sludge tank via 109A is mixed with the effluent passing from waste flasher T-008 via 84A. Any excess acid which may be present in the sludge tank discharge continues to react with dissolved sulfides in the seawater effluent to further evolve $H_2S$ gas which is chemically or otherwise bound and would not otherwise be released in the flashing and stripping operations.

The evolved $H_2S$ gas passes from the waste flashers and the waste stripper to the waste flasher compressors. In the illustrated embodiment, the compressors C-001, C-002, C-003 and C-004 may be driven by a single stream turbine through a common shaft, which together comprises a multi-stage compressor unit for compression of the released $H_2S$ for return to the dual temperature system.

Figure 2:
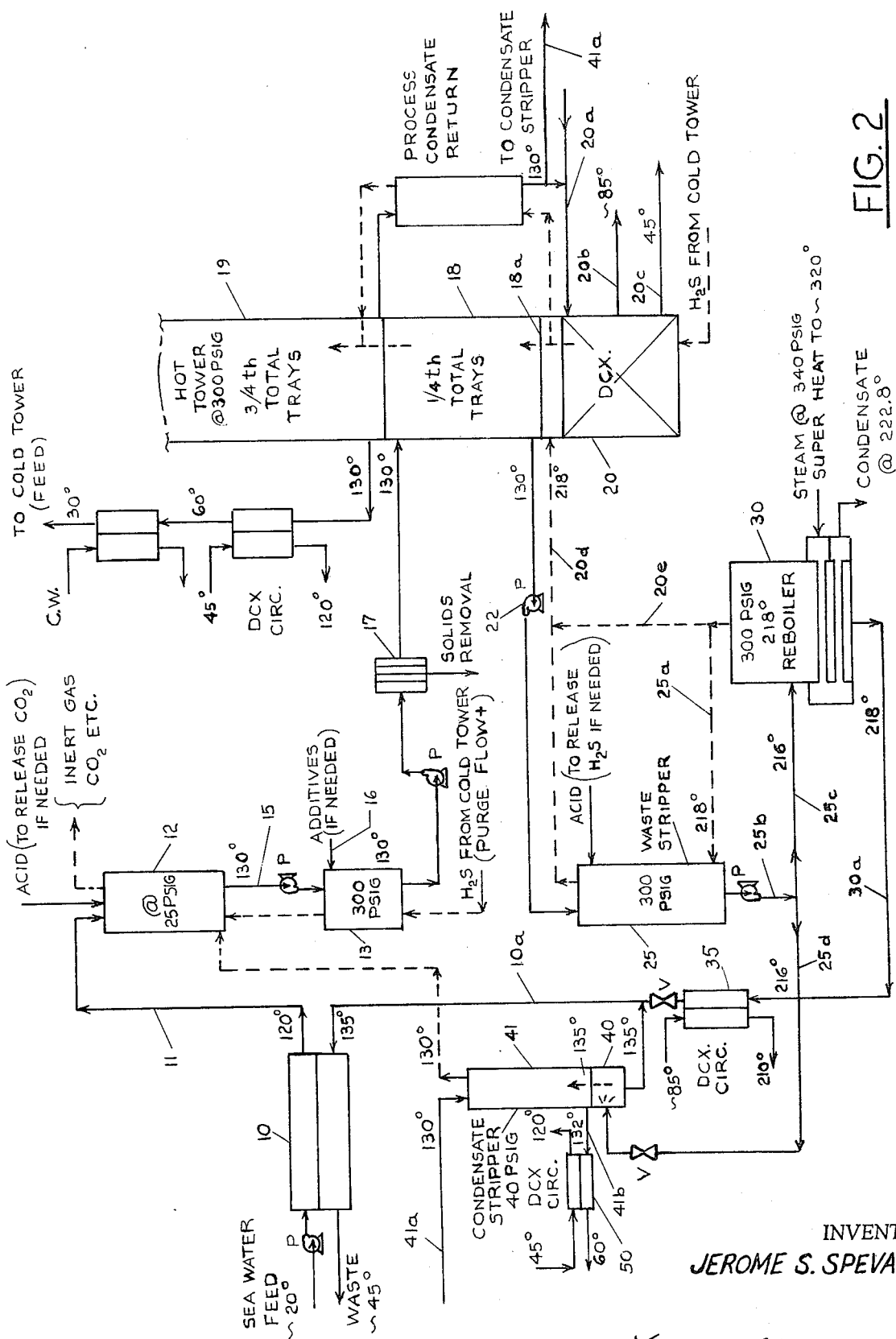
FIG. 2 is a schematic diagram of another embodiment.

Referring now to FIG. 2 of the accompanying drawings:

In this embodiment the cold sea water feed (e.g. at 20° C) is passed through an indirect contact heat exchanger 10 in countercurrent to the treated effluent passing to waste, becoming heated (e.g. to 120° C) while the effluent is cooled (e.g. from 135° C to 45° C). The heated sea water via 11 passes to a two stage $H_2S$ saturator and inert gas and dissolved $CO_2$ remover 12, 13 wherein a countercurrent contact with a stream of $H_2S$ the water becomes saturated therewith first at a lower pressure and then at a higher pressure, and the dissolved carbonates therein are converted to hydrosulfides and sulfides, freeing $CO_2$ gas, which is vented together with any inert gas content of the $H_2S$ and/or water streams. In the first stage 12 the gas is heated at a low pressure (e.g. 25 psig) approaching the temperature of the $H_2S$ gas stream (about 130° C) depending on the quantity of hot gas delivered. In the second stage 14 to which the treated water from the first stage is pumped via 15 the pressure is higher (e.g. 300 psig) and the saturation with the gas at this pressure is accomplished therein. For mineral removal or recovery, etc. the liquid (e.g. sea water) may be treated with additives supplied as via 16 for precipitating dissolved materials which can then be removed as by a filter, decanter or other separator 17, from which the treated liquid saturated with gas at the temperature and pressure of the process feed section 18 (shown as a feed section comprising the lower quarter of trays section of the hot tower of a dual temperature exchange unit 19) is delivered to said feed water section, as shown.

In this feed section 18 the saturated liquid passes in countercurrent exchange with a circulating stream of gas ($H_2S$) which has been passed through the heater and humidifier 20 where it is heated and humidified and brought to the temperature of the feed section 18. The gas heating in the form shown is accomplished in part by direct contact with a branched circulation of water entering via 20a and exiting at different temperature levels (e.g. 85° and 45° C) via 20b and 20c, augmented by injection of steam via 20d (e.g. at 218° C) sufficient to raise it to the temperature of the feed section 18 and tower 19, (e.g. 130° C). The feed fluid stream leaving the feed section 18 above the seal tray 18a (which allows gas to pass upwardly therethrough but prevents downward flow of feed liquid therethrough) is pumped via 22 to the waste stripper 25 operating at a slightly higher pressure to allow stripped gas ($H_2S$) and steam to return via 20d to the top of the humidifier section 20. Steam is supplied via 25a to the bottom of the stripper 25 passing countercurrent to the $H_2S$ saturated liquid from 22, whereby the water leaving 25 via 25b is substantially free of gas (e.g. $H_2S$). Additional steam as needed is supplied to 20d by 20e from a suitable source such as the boiler 30.

In the form shown a portion of the water stripped of $H_2S$ is passed from 25b via 25c as feed to the boiler 30 wherein it is partially evaporated by an external heat supply. The unevaporated portion via 30a, and liquid via 25d may be merged, and be used in part to heat at least a portion of the cyclic flows via 20c and/or 20b in a heat exchanger 35, and may in part be sent to a flasher 40 operating at reduced pressure where steam is evolved which may be used in stripper 41 to strip $H_2S$ from a separate flow of $H_2S$ saturated condensate formed by the cooling and dehumidification of the hot process gas from 19, about equal to the quantity of steam introduced at 20d, said condensate entering 41 via 41a at about 130° C and exiting via 41b at about 132° C then passes in countercurrent heat exchange in 50 to heat another portion of said cyclic flows 20b and/or 20c. The remaining liquid from 40 and the cooled liquid from 35 via 10a is passed through the heat exchanger 10, as above described.

While there have been described herein what are at present considered preferred embodiments of the invention, it will be obvious to those skilled in the art that modifications, including changes and omissions and substitutions, may be made without departing from the essence and principle of the invention. It is therefore to be understood that the exemplary embodiments are illustrative and not restrictive of the invention, the scope of which is defined in the appended claims, and that all modifications that come within the meaning and range of equivalency of the claims are intended to be described and included therein.

I claim:

1. An improved process for treatment of the liquid water feed and effluent of a gas and liquid contact system, in which system a flow of gas consisting essentially of hydrogen sulfide previously saturated with water vapor and a flow of liquid consisting essentially of water previously saturated with hydrogen sulfide are contacted with each other at elevated temperature and pressure, and from which system a purge stream of said gas is discharged, said water feed being essentially free of hydrogen sulfide, which treatment process comprises:

a. treating said water feed prior to its introduction into said system by
        1. heating the water feed by transferring heat thereto from said effluent, and 2. dissolving hydrogen sulfide in the so heated water feed to an amount essentially corresponding to saturation at said elevated temperature and pressure by countercurrent contact of said heated water feed with said purge stream essentially at said elevated pressure, and b. introducing the so treated water feed into said gas and liquid contact system.

2. A process as claimed in claim 1, in which said water feed contains dissolved carbonates and wherein hydrogen sulfide is reacted with said carbonates to release carbon dioxide therefrom which is removed from the water feed.

3. A process as claimed in claim 1, in which said water feed contains dissolved carbonates capable of conversion to ionizable sulfides and wherein hydrogen sulfide is reacted with said carbonates releasing carbon dioxide therefrom and forming hydrosulfide ions ($HS^-$) and sulfide ions ($S^=$) in the liquid.

4. A process as claimed in claim 1, in which said water feed contains dissolved minerals capable of conversion to insoluble sulfides and wherein hydrogen sulfide is reacted with said minerals to precipitate solids therefrom.

5. A process as claimed in claim 1, in which said water feed contains dissolved minerals comprising heavy metal components and wherein hydrogen sulfide is reacted with said minerals to precipitate solids containing heavy metal sulfides therefrom.

6. A process as claimed in claim 1, which further comprises c. passing said effluent through at least one zone maintained at a pressure lower than said elevated pressure and higher than atmospheric pressure for releasing therefrom hydrogen sulfide gas containing water vapor, and d. absorbing gases released in step (c) in the water feed during step (a) (1).

7. A process as claimed in claim 6, wherein a major part of the hydrogen sulfide in the effluent from said system is released in a series of flash evaporations at progressively reduced pressures, and is thereafter raised in pressure and returned to said system.

8. A process as claimed in claim 7, wherein the remainder of the hydrogen sulfide contained in said effluent is stripped with steam at the reduced pressure of the last flash evaporator, and is thereafter raised in pressure and returned to said system.

9. A process as claimed in claim 6, wherein:

e. in step (a) (1) the heating is effected in a plurality of stages, and the absorption of step (d) is effected in the last of said plurality of stages.

10. A process as claimed in claim 6, wherein hydrogen sulfide gas released in step (c) and not absorbed in step (d) is compressed to said elevated pressure and returned to said system.

11. A process as claimed in claim 1, wherein said water feed into which the hydrogen sulfide is dissolved is sea water.

12. An improved process for treatment of the liquid water feed and effluent of a gas and liquid contact system, in which system a flow of gas consisting essentially of hydrogen sulfide gas previously saturated with water vapor and a flow of liquid consisting essentially of water previously saturated with hydrogen sulfide are contacted with each other at elevated temperature and pressure, which improved treatment process comprises:

a. recovering heat and hydrogen sulfide from said effluent for return to said gas and liquid contact system by 1. passing said effluent through at least one zone maintained at a pressure lower than the said elevated pressure and higher than atmospheric pressure for releasing therefrom hydrogen sulfide gas containing water vapor, and 2. cooling said released gas by direct contact with a flow of water and thereby raising the temperature of said flow of water, and b. passing said flow of water from step (a) (2) as water feed to said gas and liquid contact system, and c. compressing said cooled released gas substantially to said elevated pressure for return thereof to said gas and liquid contact system.

13. An improved process as claimed in claim 12, which comprises:

d. transferring heat to a water stream passing to said gas and liquid contact system by heat exchange with said effluent from step (a) (1).

14. An improved process as claimed in claim 12, in which said at least one zone is one of a plurality of separate zones, and which further comprises:

d. stripping hydrogen sulfide from said effluent by counter-current contact thereof with a flow of water vapor at substantially the pressure of the last of said separate zones.

* * * * *

UNITED STATES PATENT OFFICE
CERTIFICATE OF CORRECTION

PATENT NO. : 3,984,518

DATED : October 5, 1976

INVENTOR(S) : Jerome S. Spevack

It is certified that error appears in the above-identified patent and that said Letters Patent are hereby corrected as shown below:

Referring to the numbered Columns of the patent: In Column 1, at line 32, for "liquid also a" read "a" and for "which" read "which liquid also", and In Column 2, at lines 29-30, for "3A; motive" read "3A. Motive", at line 61, for "P-004" read "T-004", at line 62, for "P-005" read "T-005", and at line 65, for "T-002 against" read "against"; In Column 3, at line 14, for "solublize" read "solubilize", and at line 24, for "carbon-dioxide" read "carbon dioxide"; In Column 4, at line 18, for "Inconelclad" read "Inconel-clad", and at line 36, for "FIGS." read "FIG."; In Column 5, at line 30, for "stream" read "steam", at line 47, for "gas," read "gas", at line 53, for "14" read "13", at line 64, for "tower" read "tower 18,19" and for "exchange unit 19" read "hot tower and cold tower exchange unit"; In Column 6, at line 25, for "30a, and" read "30a and", and at line 34, for "20d, said" read "20d. Said"; In Column 6, at line 65, and in Column 8, at line 20, for "a." read "(a)"; In Column 6, at line 67, and in Column 8, at line 23, for "1." read "(1)"; In Column 7, at line 1, and in Column 8, at line 28, for "2." read "(2)"; In Column 7, at line 7, and in Column 8, at line 31, for "b." read "(b)"; In Column 7, at line 32, and in Column 8, at line 34, for "c." read "(c)"; In Column 7, at line 37, and in Column 8, at lines 39 and 46, for "d." read "(d)"; In Column 8, at line 1, for "e." read "(e)"; and In Column 8, at line 47, for "counter-current" read "countercurrent".

Signed and Sealed this

Thirty-first Day of July 1979

[SEAL]

Attest:

Attesting Officer

LUTRELLE F. PARKER
Acting Commissioner of Patents and Trademarks